US008615001B2

(12) United States Patent (10) Patent No.: US 8,615,001 B2
Cheng et al. (45) Date of Patent: Dec. 24, 2013

(54) METHODS AND SYSTEMS FOR EFFICIENT TLV MANAGEMENT

(75) Inventors: Steven D. Cheng, San Diego, CA (US); Fangqi Hu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 717 days.

(21) Appl. No.: 12/250,179

(22) Filed: Oct. 13, 2008

(65) Prior Publication Data

US 2010/0091757 A1 Apr. 15, 2010

(51) Int. Cl.
*H04J 3/00* (2006.01)
*H04J 3/24* (2006.01)

(52) U.S. Cl.
USPC .......................... 370/345; 370/336; 370/349

(58) Field of Classification Search
USPC ................................................. 370/336, 349
See application file for complete search history.

(56) References Cited

U.S. PATENT DOCUMENTS

| | | | | |
|---|---|---|---|---|
| 5,951,651 | A * | 9/1999 | Lakshman et al. | 709/239 |
| 7,428,227 | B2 * | 9/2008 | Park et al. | 370/331 |
| 2006/0156413 | A1 * | 7/2006 | Oh et al. | 726/26 |
| 2007/0010262 | A1 * | 1/2007 | Kang et al. | 455/458 |
| 2008/0002610 | A1 | 1/2008 | Zheng et al. | |

FOREIGN PATENT DOCUMENTS

CN 1961504 A 5/2007

OTHER PUBLICATIONS

Eklund, Carl et al.: "IEEE Standard 802.16: A Technical Overview of the Wirelessman Air Interface for Broadband Wireless Access," IEEE Communications Magazine, (Jun. 2002), vol. 40, pp. 98-107.
IEEE Computer Society and the IEEE Microwave Theory and Techniques Society: "802.16 IEEE Standard for Local and Metropolitan Area Networks—Part 16: Air Interface for Fixed Broadband Wireless Access Systems," IEEE Std 802.16-2004, (Oct. 1, 2004), XP002599369, New York, USA.
International Search Report and Written Opinion—PCT/US2009/059145, International Search Authority—European Patent Office—Sep. 17, 2010.
Open Mobile Alliance, "OMA-AD-DRM-V2_0_1-20080226-A," DRM Architecture Approved Version 2.0.1, pp. 1-24, Feb. 26, 2008.
Open Mobile Alliance, "OMA-DRM-ARCH-V2_0-20030901-D," DRM Architecture, Draft Version 2.0, pp. 1-15, Sep. 1, 2003.
Taiwan Search Report—TW098134654—TIPO—Oct. 25, 2012.

* cited by examiner

*Primary Examiner* — Derrick Ferris
*Assistant Examiner* — Kodzovi Acolatse
(74) *Attorney, Agent, or Firm* — Linda G. Gunderson

(57) ABSTRACT

Certain embodiments provide a method for managing updates to type-length-value (TLV) parameters used in a mobile station. The method generally includes generating a TLV bitmap having a plurality of bits to indicate whether or not updates exist to a corresponding plurality of TLV parameters, generating one or more client module registration bitmaps to indicate a subset of the TLV parameters utilized by a corresponding one or more client modules running on the mobile station, updating the TLV bitmap to indicate one or more TLV parameters modified by one or more MAC management messages, identifying one or more client modules that utilize the one or more TLV parameters modified by the one or more MAC management messages, as indicated by the client module registration bitmaps, and notifying the identified client modules of the modified TLV parameters.

20 Claims, 12 Drawing Sheets

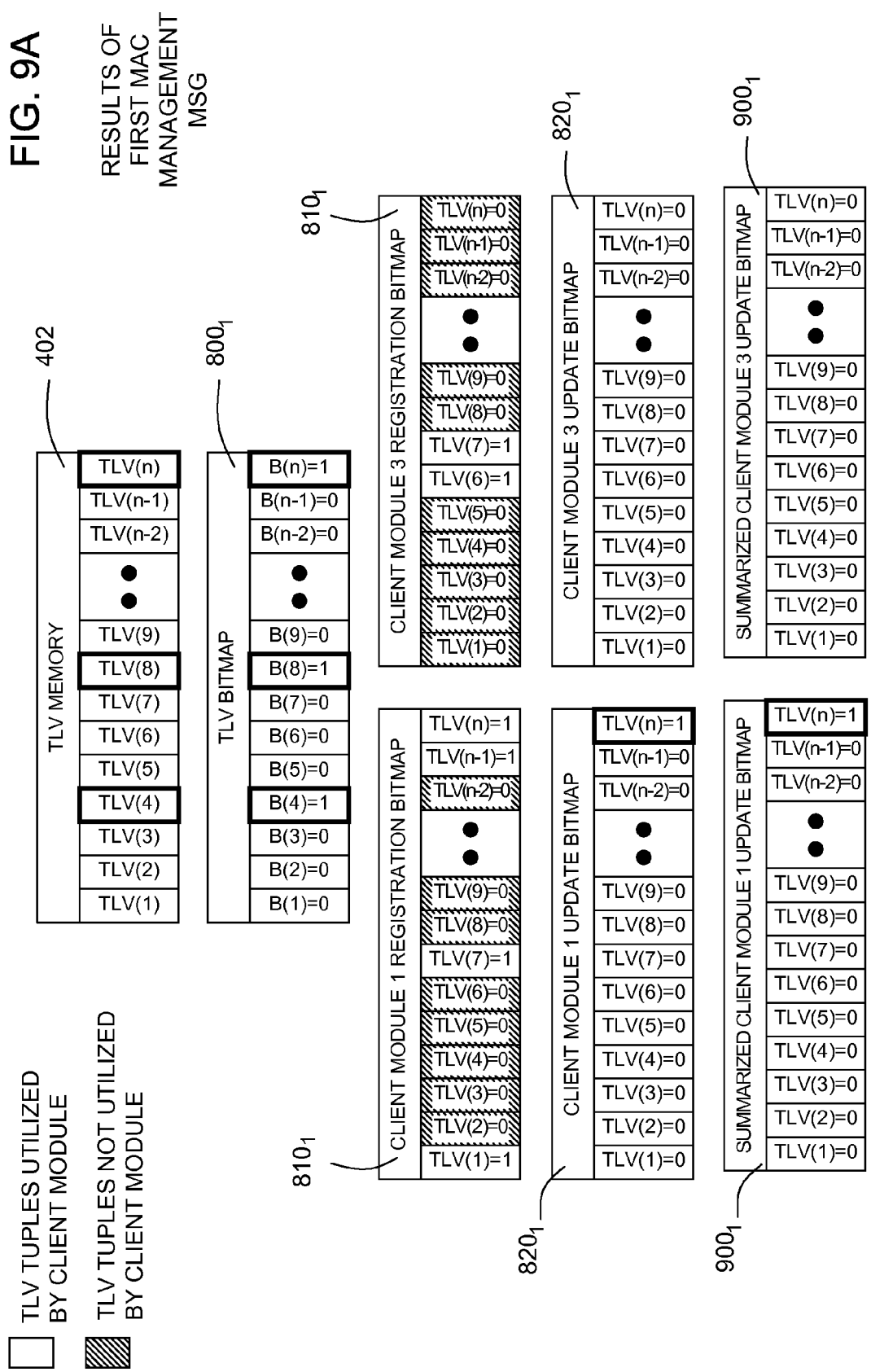

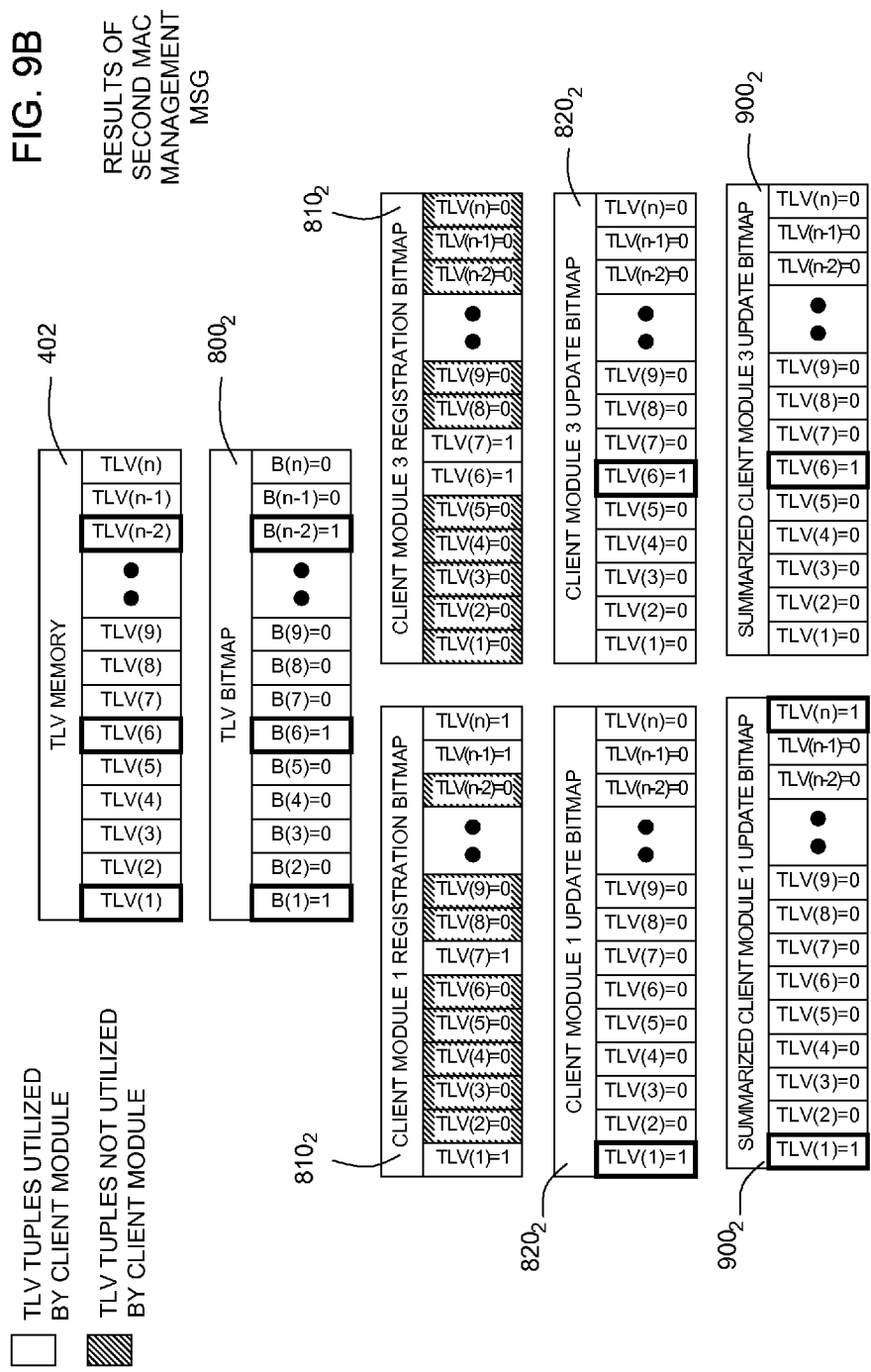

METHODS AND SYSTEMS FOR EFFICIENT TLV MANAGEMENT

TECHNICAL FIELD

Embodiments of the present disclosure generally relate to wireless communications and, more particularly, to type-length-value (TLV) parameter management by a mobile station.

BACKGROUND

The rapid growth in wireless communications services, such as broadband Internet access and streaming media applications, leads to an increasing demand for higher data rates. Advancements in multiplexing schemes, such as Orthogonal Frequency Division Multiplexing (OFDM) and Orthogonal Frequency Division Multiple Access (OFDMA), are important for next generation wireless communications systems. This is due to the fact that such schemes can provide many advantages including modulation efficiency, spectrum efficiency, flexibility (e.g., allowing differentiated quality of service), and strong multi-path immunity over conventional single carrier modulation schemes.

One example of a communication system based on an orthogonal multiplexing scheme is a WiMAX system. WiMAX, which stands for the Worldwide Interoperability for Microwave Access, is a standards-based broadband wireless technology that provides high-throughput broadband connections over long distances.

In the WiMAX communication protocol, Base stations will update the MAC management messages periodically. Each MAC management message has a set of fields plus a set of TLV (TLV is a tuple of Type, Length, and Value), and TLVs can (recursively) contain other TLV. The value of some TLVs is consumed by a list of modules inside the mobile device protocol stack. Since the appearance of TLV is variable and unpredictable and the order of these TLVs can be out of sequence, the decoding of TLVs is time consuming and the distribution of the TLVs values to the related modules become latency intensive. As a result, mobile device microprocessor without interlocked pipeline stages (MIPS) consumption may increase and delay processing time, which may ultimately result in the information needed by each module becoming out of sync and causing a crash of the protocol stack.

SUMMARY

Certain embodiments provide a method for managing updates to type-length-value (TLV) parameters used in a mobile station. The method generally includes generating a TLV bitmap having a plurality of bits to indicate whether or not updates exist to a corresponding plurality of TLV parameters, generating one or more client module registration bitmaps to indicate a subset of the TLV parameters utilized by a corresponding one or more client modules running on the mobile station, updating the TLV bitmap to indicate one or more TLV parameters modified by one or more MAC management messages, identifying one or more client modules that utilize the one or more TLV parameters modified by the one or more MAC management messages, as indicated by the client module registration bitmaps, and notifying the identified client modules of the modified TLV parameters.

Certain embodiments provide an apparatus for managing updates to type-length-value (TLV) parameters used in a mobile station. The apparatus generally includes logic for generating a TLV bitmap having a plurality of bits to indicate whether or not updates exist to a corresponding plurality of TLV parameters, logic for generating one or more client module registration bitmaps to indicate a subset of the TLV parameters utilized by a corresponding one or more client modules running on the mobile station, logic for updating the TLV bitmap to indicate one or more TLV parameters modified by one or more MAC management messages, logic for identifying one or more client modules that utilize the one or more TLV parameters modified by the one or more MAC management messages, as indicated by the client module registration bitmaps, and logic for notifying the identified client modules of the modified TLV parameters.

Certain embodiments provide an apparatus for managing updates to type-length-value (TLV) parameters used in a mobile station. The apparatus generally includes means for generating a TLV bitmap having a plurality of bits to indicate whether or not updates exist to a corresponding plurality of TLV parameters, means for generating one or more client module registration bitmaps to indicate a subset of the TLV parameters utilized by a corresponding one or more client modules running on the mobile station, means for updating the TLV bitmap to indicate one or more TLV parameters modified by one or more MAC management messages, means for identifying one or more client modules that utilize the one or more TLV parameters modified by the one or more MAC management messages, as indicated by the client module registration bitmaps, and means for notifying the identified client modules of the modified TLV parameters.

Certain embodiments provide a computer-program product for managing updates to type-length-value (TLV) parameters used in a mobile station, comprising a computer readable medium having instructions stored thereon, the instructions being executable by one or more processors. The instructions generally include instructions for generating a TLV bitmap having a plurality of bits to indicate whether or not updates exist to a corresponding plurality of TLV parameters, instructions for generating one or more client module registration bitmaps to indicate a subset of the TLV parameters utilized by a corresponding one or more client modules running on the mobile station, instructions for updating the TLV bitmap to indicate one or more TLV parameters modified by one or more MAC management messages, instructions for identifying one or more client modules that utilize the one or more TLV parameters modified by the one or more MAC management messages, as indicated by the client module registration bitmaps, and instructions for notifying the identified client modules of the modified TLV parameters.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 9A and 9B illustrate the use of a summary bitmap to aggregate multiple changes resulting from two MAC management messages, in accordance with embodiments of the present disclosure.

DETAILED DESCRIPTION

Embodiments of the present disclosure provide a hierarchical bitmap-based centralized management scheme for notifying client modules, in a mobile device, of updates to the values of TLV tuples. This bitmap-based scheme may help reduce the memory usage inside a TLV processing engine, reduce the memory latency through the TLV value delivery using a zero-copy method, and reduce the total number of notifications sent from the TLV processing engine to its client modules while maintaining data integrity between the TLV engine and its client modules.

Exemplary Wireless Communication System

The word "exemplary" is used herein to mean "serving as an example, instance, or illustration." Any embodiment described herein as "exemplary" is not necessarily to be construed as preferred or advantageous over other embodiments.

The techniques described herein may be used for various broadband wireless communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

One specific example of a communication system based on an orthogonal multiplexing scheme is a WiMAX system. WiMAX, which stands for the Worldwide Interoperability for Microwave Access, is a standards-based broadband wireless technology that provides high-throughput broadband connections over long distances. There are two main applications of WiMAX today: fixed WiMAX and mobile WiMAX. Fixed WiMAX applications are point-to-multipoint, enabling broadband access to homes and businesses, for example. Mobile WiMAX offers the full mobility of cellular networks at broadband speeds.

IEEE 802.16x is an emerging standard organization to define an air interface for fixed and mobile broadband wireless access (BWA) systems. These standards define at least four different physical layers (PHYs) and one media access control (MAC) layer. The OFDM and OFDMA physical layer of the four physical layers are the most popular in the fixed and mobile BWA areas respectively.

Figure 1:
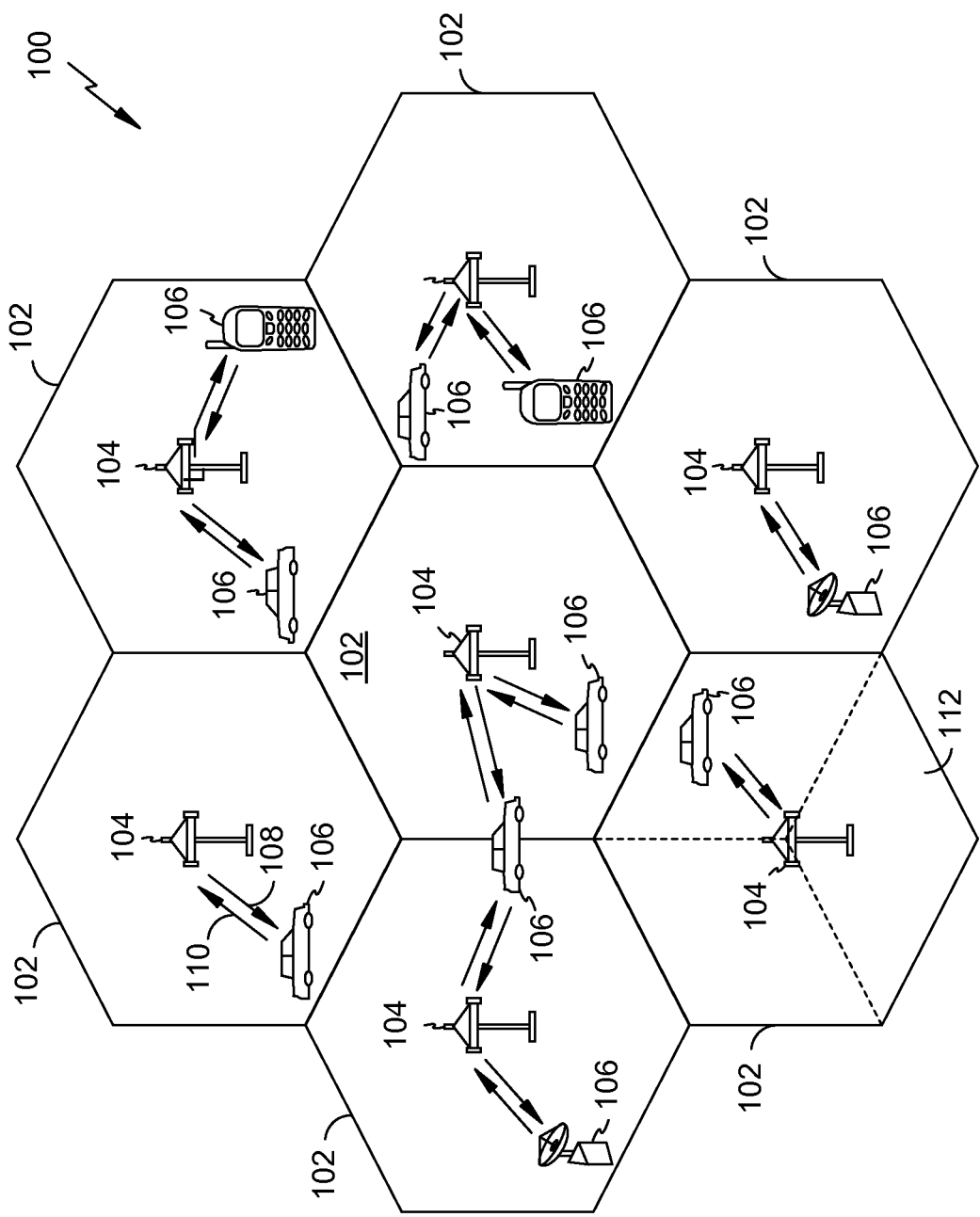
FIG. 1 illustrates an example wireless communication system, in accordance with certain embodiments of the present disclosure.

FIG. 1 illustrates an example of a wireless communication system 100 in which embodiments of the present disclosure may be employed. The wireless communication system 100 may be a broadband wireless communication system. The wireless communication system 100 may provide communication for a number of cells 102, each of which is serviced by a base station 104. A base station 104 may be a fixed station that communicates with user terminals 106. The base station 104 may alternatively be referred to as an access point, a Node B, or some other terminology.

FIG. 1 depicts various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers, etc.

A variety of algorithms and methods may be used for transmissions in the wireless communication system 100 between the base stations 104 and the user terminals 106. For example, signals may be sent and received between the base stations 104 and the user terminals 106 in accordance with OFDM/OFDMA techniques. If this is the case, the wireless communication system 100 may be referred to as an OFDM/OFDMA system.

A communication link that facilitates transmission from a base station 104 to a user terminal 106 may be referred to as a downlink 108, and a communication link that facilitates transmission from a user terminal 106 to a base station 104 may be referred to as an uplink 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas.

Figure 2:
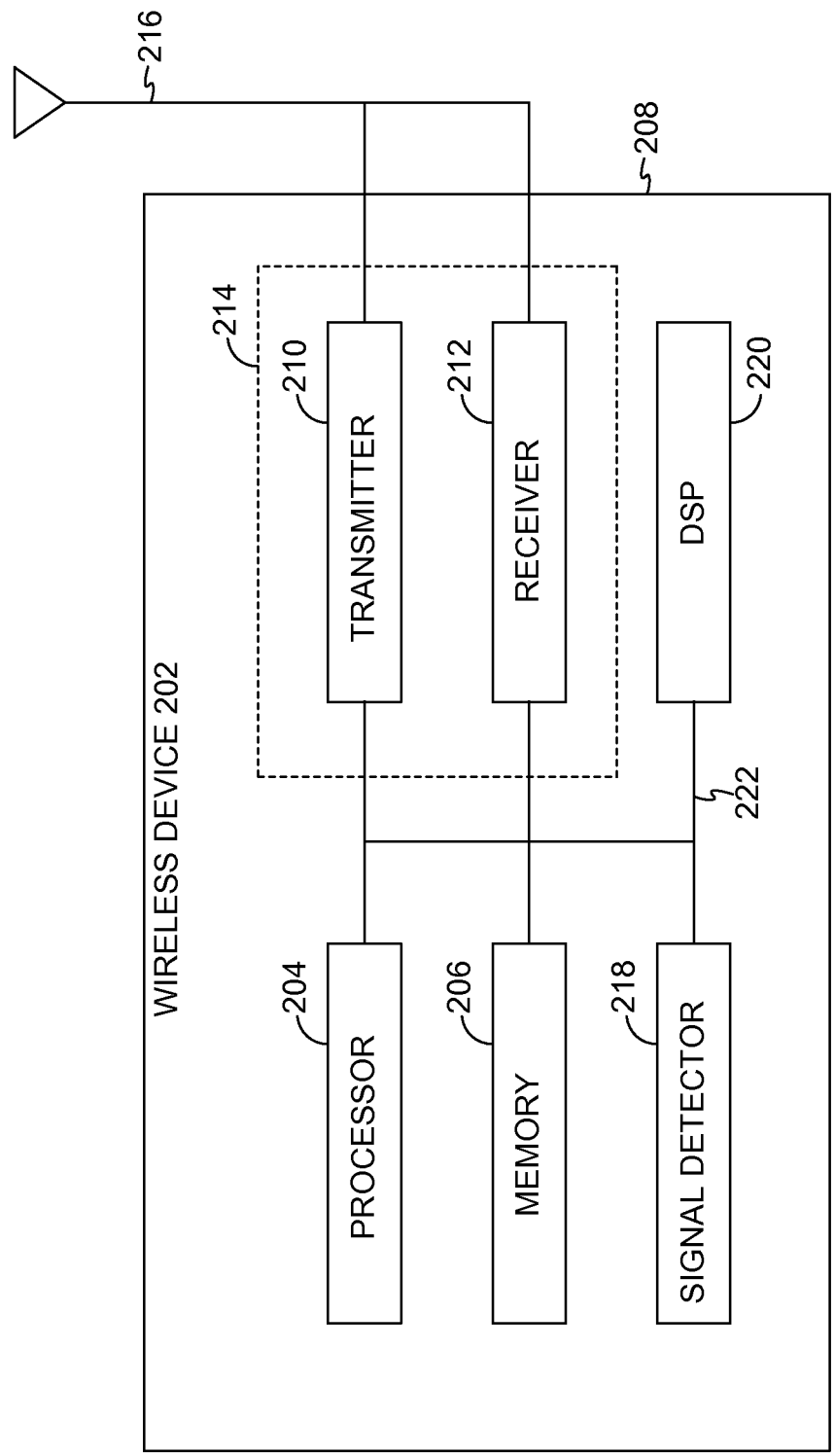
FIG. 2 illustrates various components that may be utilized in a wireless device in accordance with certain embodiments of the present disclosure.

FIG. 2 illustrates various components that may be utilized in a wireless device 202 that may be employed within the wireless communication system 100. The wireless device 202 is an example of a device that may be configured to implement the various methods described herein. The wireless device 202 may be a base station 104 or a user terminal 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, pilot energy per pseudonoise (PN) chips, power spectral density and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Figure 3:
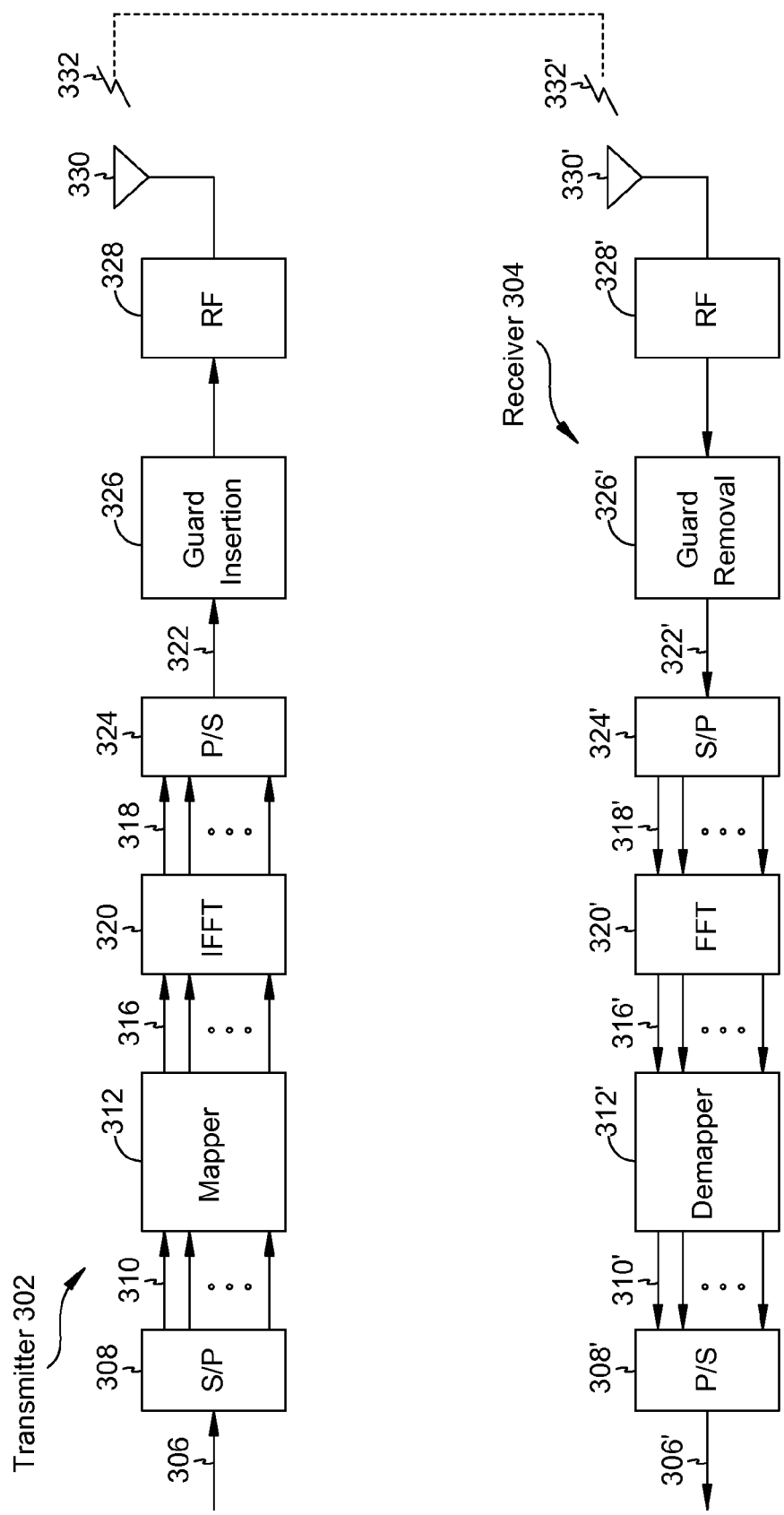
FIG. 3 illustrates an example transmitter and an example receiver that may be used within a wireless communication system that utilizes orthogonal frequency-division multiplexing and orthogonal frequency division multiple access (OFDM/OFDMA) technology in accordance with certain embodiments of the present disclosure.

FIG. 3 illustrates an example of a transmitter 302 that may be used within a wireless communication system 100 that utilizes OFDM/OFDMA. Portions of the transmitter 302 may be implemented in the transmitter 210 of a wireless device 202. The transmitter 302 may be implemented in a base station 104 for transmitting data 306 to a user terminal 106 on a downlink 108. The transmitter 302 may also be implemented in a user terminal 106 for transmitting data 306 to a base station 104 on an uplink 110.

Data 306 to be transmitted is shown being provided as input to a serial-to-parallel (S/P) converter 308. The S/P converter 308 may split the transmission data into N parallel data streams 3 10.

The N parallel data streams 310 may then be provided as input to a mapper 312. The mapper 312 may map the N parallel data streams 310 onto N constellation points. The mapping may be done using some modulation constellation, such as binary phase-shift keying (BPSK), quadrature phase-shift keying (QPSK), 8 phase-shift keying (8PSK), quadrature amplitude modulation (QAM), etc. Thus, the mapper 312 may output N parallel symbol streams 316, each symbol stream 316 corresponding to one of the N orthogonal subcarriers of the inverse fast Fourier transform (IFFT) 320. These N parallel symbol streams 316 are represented in the frequency domain and may be converted into N parallel time domain sample streams 318 by an IFFT component 320.

A brief note about terminology will now be provided. N parallel modulations in the frequency domain are equal to N modulation symbols in the frequency domain, which are equal to N mapping and N-point IFFT in the frequency domain, which is equal to one (useful) OFDM symbol in the time domain, which is equal to N samples in the time domain. One OFDM symbol in the time domain, Ns, is equal to Ncp (the number of guard samples per OFDM symbol)+N (the number of useful samples per OFDM symbol).

The N parallel time domain sample streams 318 may be converted into an OFDM/OFDMA symbol stream 322 by a parallel-to-serial (P/S) converter 324. A guard insertion component 326 may insert a guard interval between successive OFDM/OFDMA symbols in the OFDM/OFDMA symbol stream 322. The output of the guard insertion component 326 may then be upconverted to a desired transmit frequency band by a radio frequency (RF) front end 328. An antenna 330 may then transmit the resulting signal 332.

FIG. 3 also illustrates an example of a receiver 304 that may be used within a wireless device 202 that utilizes OFDM/OFDMA. Portions of the receiver 304 may be implemented in the receiver 212 of a wireless device 202. The receiver 304 may be implemented in a user terminal 106 for receiving data 306 from a base station 104 on a downlink 108. The receiver 304 may also be implemented in a base station 104 for receiving data 306 from a user terminal 106 on an uplink 110.

The transmitted signal 332 is shown traveling over a wireless channel. When a signal 332' is received by an antenna 330', the received signal 332' may be downconverted to a baseband signal by an RF front end 328'. A guard removal component 326' may then remove the guard interval that was inserted between OFDM/OFDMA symbols by the guard insertion component 326.

The output of the guard removal component 326' may be provided to an S/P converter 324'. The S/P converter 324' may divide the OFDM/OFDMA symbol stream 322' into the N parallel time-domain symbol streams 318', each of which corresponds to one of the N orthogonal subcarriers. A fast Fourier transform (FFT) component 320' may convert the N parallel time-domain symbol streams 318' into the frequency domain and output N parallel frequency-domain symbol streams 316'.

A demapper 312' may perform the inverse of the symbol mapping operation that was performed by the mapper 312 thereby outputting N parallel data streams 310'. A P/S converter 308' may combine the N parallel data streams 310' into a single data stream 306'. Ideally, this data stream 306' corresponds to the data 306 that was provided as input to the transmitter 302. Note that elements 308', 310', 312', 316', 320', 318' and 324' may all be found on a in a baseband processor.

Exemplary Efficient TLV Management Scheme for WiMAX

In accordance with the WiMAX communication protocol previously discussed, base stations (BSs) may periodically transmit updated Media Access Control (MAC) management messages in the payload of a MAC protocol data unit (PDU). Each MAC management message may have a set of parameters described by standard fields with a defined size, as well as, a set of parameters described by type, length, value (TLV) tuples of a variable size. Additionally, the value field of some TLVs may contain additional TLVs or lists of modules inside a mobile device protocol stack.

One example of a MAC management message defined under current versions of the IEEE 802.16 standard is a Ranging Request (RNG-REQ) message which may have an 8-bit field indentifying a management message type, 8 reserved bits, and a set of TLV tuples of variable size. Common TLVs found in the RNG-REQ message may include a mobile station (MS) identification TLV, a serving BS identification TLV, and a power saving class parameters TLV.

The MS identification TLV may be a simple element with a fixed length containing the MAC address of the MS to which the RNG-REQ message is destined. Similarly, the serving BS identification TLV may be a simple element with a fixed length containing the MAC address of the serving BS. However, the power saving class parameters TLV may be a compound element with a variable length specifying a set of power saving class definitions and operations.

The value field of the power saving class parameters TLV element may include a plurality of additional TLV parameters which may be simple or compound in nature. For example, the value field of the power saving class parameters TLV may include a power saving class identification TLV, a starting frame number TLV, or a listening window TLV.

Since the appearance of TLVs within a MAC management message is unpredictable and variable in size and the order of the TLVs may be out of sequence, the decoding of TLVs may be time consuming. Additionally, the distribution of TLV values to related client modules may become latency intensive which may increase the demands on one or more of the MS processors (e.g. a microprocessor without interlocked pipeline stages). Consequently, the decoding of TLV tuples may delay processing time and the information needed by the client modules may become out of sync with the instructions being executed, which may crash the protocol stack.

Embodiments of the present disclosure, however, may help avoid or reduce the impact of such problems, by employing a hierarchical bitmap-based centralized management scheme in managing updates to the values of TLV tuples. This may reduce the memory usage inside a TLV processing engine, reduce the total number of notifications sent from the TLV processing engine to its client modules while maintaining data integrity between the TLV engine and its client modules. For certain embodiments, memory latency may be reduced through the TLV value delivery using a zero-copy method (e.g., with modules directly accessing relevant values avoiding the need to keep local copies).

Figure 4:
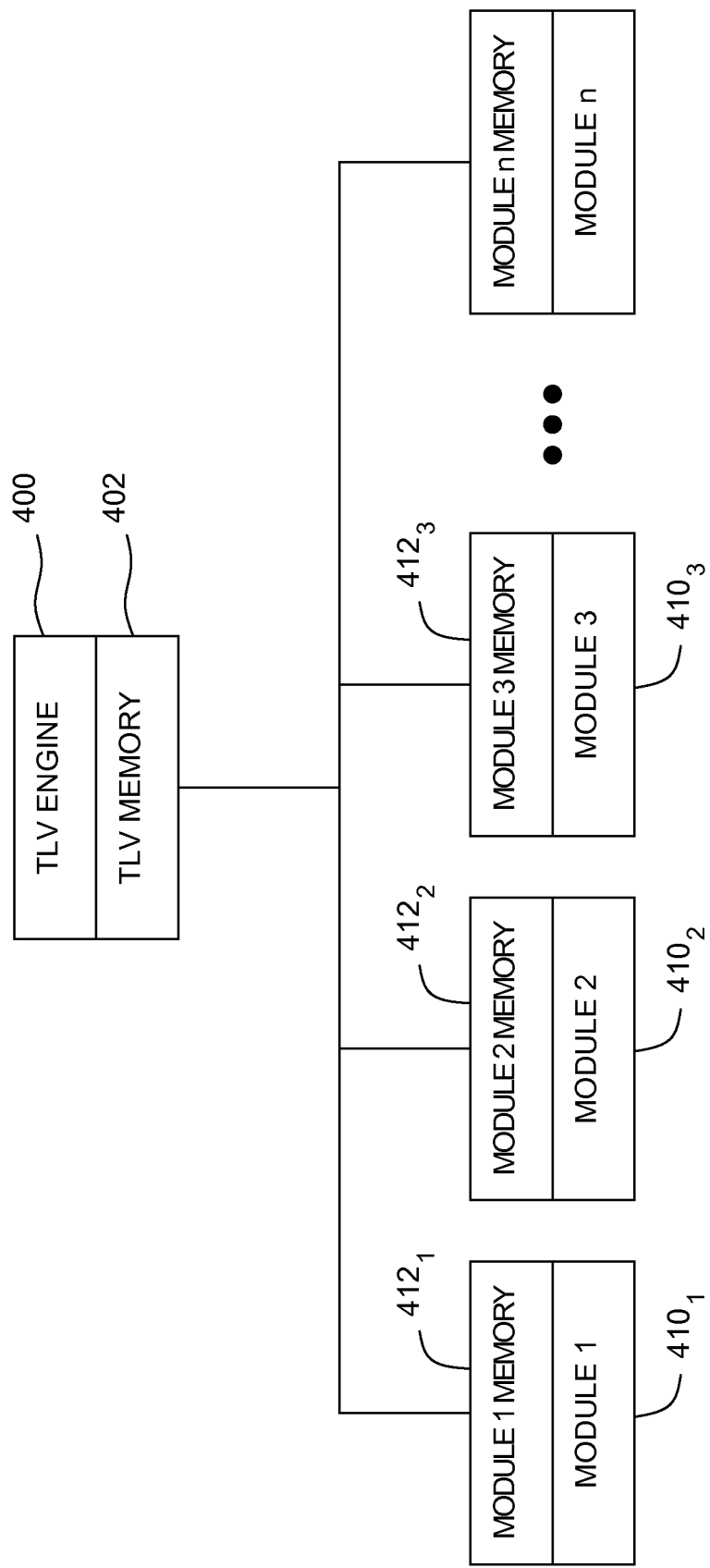
FIG. 4 illustrates a TLV engine based client server architecture, in accordance with certain embodiments of the present disclosure.

FIG. 4 illustrates a TLV engine 400 and various client modules 410 configured in a client-server architecture, which may operate within a mobile station (illustratively, m client modules $4101_1$-$410_m$ are shown). In some embodiments, the TLV engine 400 may be a microprocessor dedicated to decoding and processing TLV tuples, while in certain embodiments the TLV engine 400 may be a single processing core within a multi-core processor.

In certain embodiments of the present disclosure, each client module 410 may be one of a plurality of tasks or operations performed by the mobile station. For example, one client module 410 may be a mobility management function performed by the MS, while another client module 410 may be a ranging function, and another client module 410 may be a scanning function. Additionally, an MS may have 30 or more client modules 410 operating during any given period.

In certain embodiments, each of the client modules $410_{1-m}$ may have corresponding memory $412_{1-m}$ in which a local copy of one or more of the WiMAX parameters described by TLV tuples may be maintained. In some embodiments, a client module memory 412 may be a segment of a larger block of memory reserved for a specific client module 410, integrated on a die with associated processing hardware, or implemented by any other means known by those skilled in the art. Additionally, the client module memory 412 may be sufficiently large so as to store a copy of each TLV tuple, despite the fact that only a subset of TLV tuples is utilized by the client module 410.

In some embodiments, the client module memory 412 may not contain local copies of the one or more WiMAX parameters described by TLV tuples. Instead, the client modules 410 may store pointers to locations in the TLV memory. In embodiments such as these, the client module 410 may directly access the TLV memory 402 with the aid of pointers. This may enable the client module to operate in a "zero-copy", direct access method.

In some embodiments, a TLV engine 400 may have sufficient TLV memory 402 to store all of the WiMAX parameters which may be described by TLV tuples. Like the previously described client module memory 412, the TLV memory 402 may be a segment of a larger block of memory reserved for TLV processing, integrated on a die with associated processing hardware, or implemented by any other means known by those skilled in the art.

It is important to note that any given client module 410 may only use a subset of the WiMAX parameters described by TLV tuples. Additionally, each subset of TLV tuples utilized by a client module 410 may be unique and independent from any other subset of TLV tuples utilized by other modules.

Figure 5:
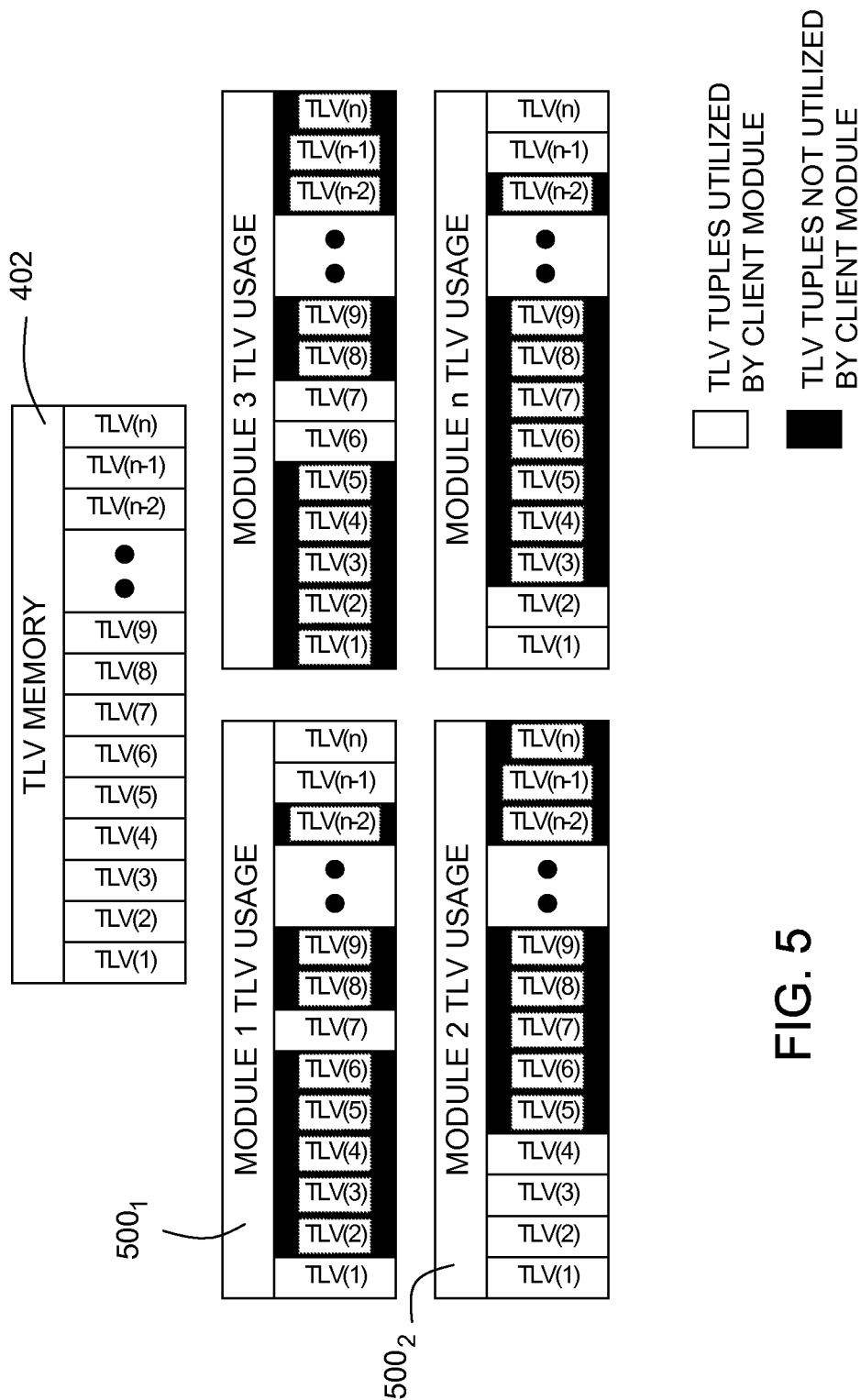
FIG. 5 illustrates a plurality of TLV parameter subsets utilized by a plurality of client modules, in accordance with certain embodiments of the present disclosure.

FIG. 5 illustrates how different subsets of TLV tuples may be utilized by different modules. FIG. 5 illustrates TLV memory 402 in which tuples TLV(1) through TLV(n) are stored. FIG. 5 illustrates four unique and independent subsets of tuples 500 ($500_1$-$500_m$) which may be utilized by different client modules $410_1$-$410_m$.

In the illustrated example, client module 1 utilizes a first subset of TLV tuples 5001 including TLV(1), TLV(7), TLV(n-1), and TLV(n). TLV tuples of no interest to a specific client module are denoted with shading, as used with TLV(2) through TLV(6) which are not used by module 1. Module 2 utilizes a second subset of TLV tuples $500_2$ including TLV(1), TLV(2), TLV(3), and TLV(4). Module 3 utilizes a third subset of TLV tuples 5003 including TLV(6) and TLV(7). Module m utilizes an $m^{th}$ subset of TLV tuples $500m$ including TLV(1), TLV(2), TLV(n-1) and TLV(n).

Figure 6:
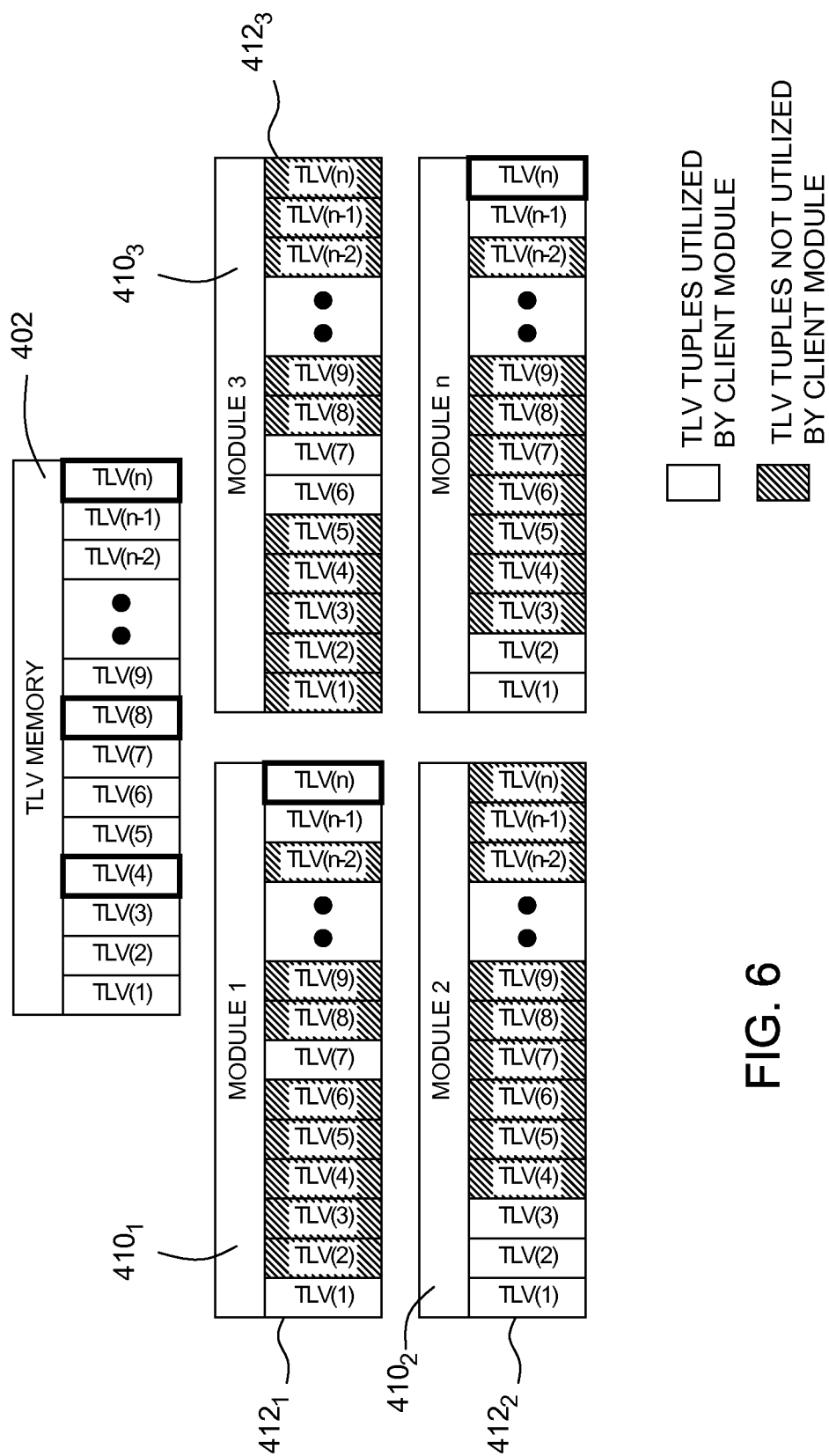
FIG. 6 illustrates that a single MAC management message may bring different TLV parameter changes to different client modules, in accordance with certain embodiments of the present disclosure.

Referring now to FIG. 6, when an MS receives a MAC management message, the TLV engine 400 may update the values of one or more TLV tuples stored in the TLV memory 402. FIG. 6 illustrates three TLV tuples (e.g., TLV(4), TLV(8), and TLV(n)) which have been updated in the TLV memory 402, as a result of the MS receiving a MAC management message. Accordingly, the client module memory 412 of the various client modules 410 may need to be updated to maintain data integrity between the TLV memory 402 and the client module memory 412. However, since tuples TLV(4) and TLV(8) are of no interest to client module 1 $410_1$, there is no need to update those tuples in the client module memory $412_1$ of client module 1 $410_1$. Consequently, tuple TLV(n) stored in the client module memory $412_1$ may be the only TLV tuple updated in the client module memory $412_1$.

Similarly, TLV(4) may be the only TLV tuple in the client module memory 4122 of client module 2 $410_2$ which needs to be updated. In fact, the client module memory 412 of certain client modules 410 may have no need of being updated in response to a given MAC management message. For example, the MAC management message received in FIG. 6 resulted in updates to tuples TLV(4), TLV(8), and TLV(n); however, client module 3 $410_3$ currently has no interest in any of those tuples, as indicated by the shading of TLV(4), TLV(8), and TLV(n). Consequently, the client module memory 4123 has no immediate need of being updated in response to the given MAC management message.

Figure 7:
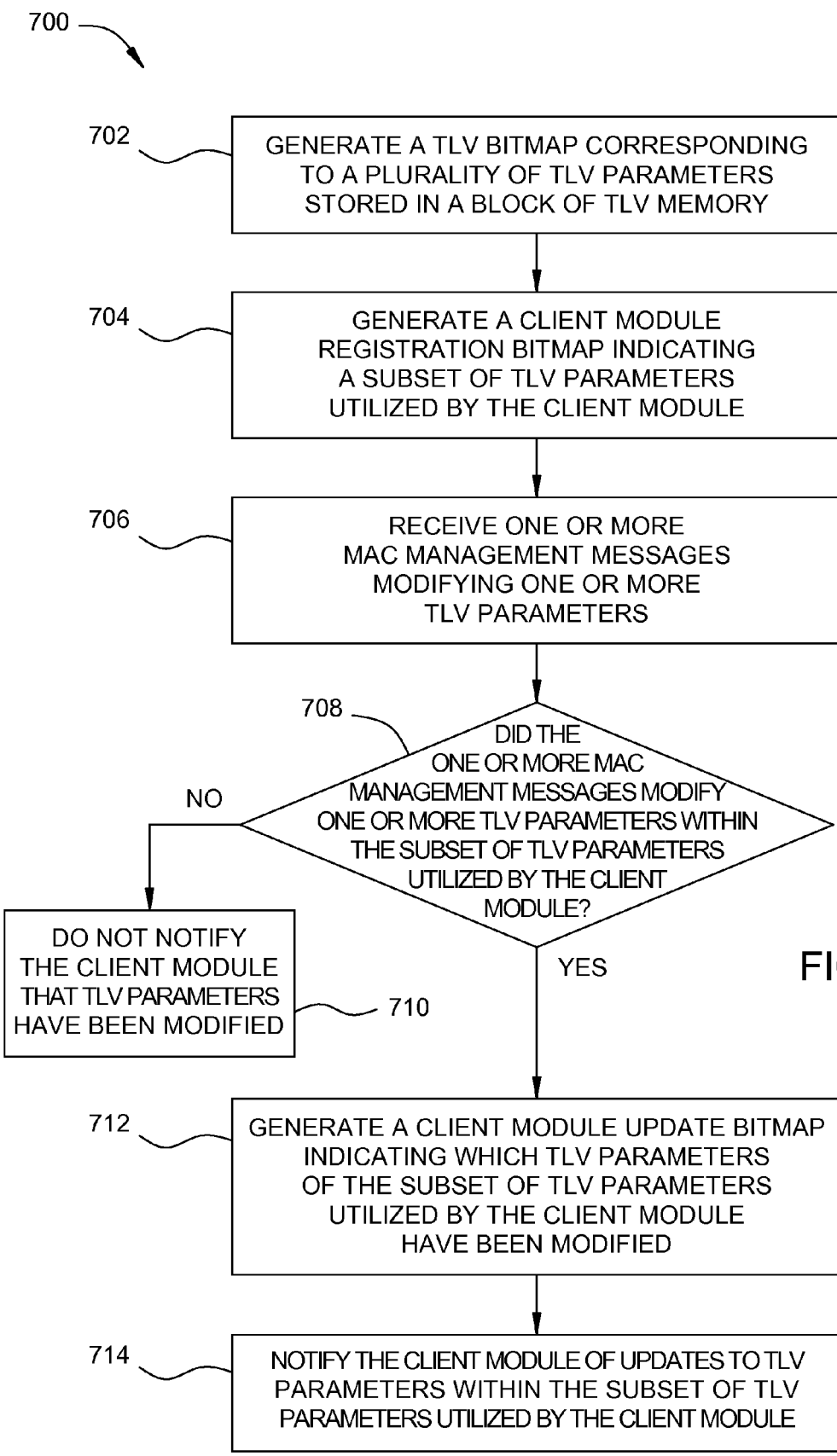
FIG. 7 illustrates example operations for employing bitmap-based centralized management scheme in managing updates to the values of TLV tuples, in accordance with embodiments of the present disclosure.

FIG. 7 illustrates example operations 700 that may be performed, for example, by a TLV engine 400, for managing TLVs for a plurality of modules. By generating a bitmap indicative of updates to one or more TLV parameters corresponding to the plurality of TLV parameters within a block of TLV memory 402, the operations 700 may help reduce the memory usage inside a TLV processing engine and reduce the total number of notifications sent from the TLV processing engine to its client modules while maintaining data integrity between the TLV engine and its client modules. Furthermore, while the operations 700 are shown for a single client module, those skilled in the art will recognize that similar operations may be performed by a TLV engine to update TLVs for multiple active modules in an MS.

Operations begin, at 702, with the TLV engine 400 generating a TLV bitmap corresponding to a plurality of TLV parameters stored within a block of TLV memory 402. In some embodiments of the present disclosure, each bit of the TLV bitmap may correspond to an individual TLV parameter within a block of TLV memory 402.

At 704, the TLV engine 400 may generate a client module registration bitmap indicating a subset of TLV parameters utilized by the client module. For example, one client module 410 served by the TLV engine 400 may be a ranging function. The ranging function may utilize a mobile station (MS) identification TLV, a serving BS identification TLV, a power saving class parameters TLV, and several other TLVs. Accordingly, the TLV engine 400 may generate a client module registration bitmap in which each bit of the client module registration bitmap may correspond to an individual TLV parameter within a block of TLV memory 402, and the subset of TLV parameters utilized by the client module may be indicated by changing the value of the corresponding bit from a '0' to a '1.'

At 706, the TLV engine 400 may process one or more MAC management messages received by the MS which modify one or more TLV parameters stored in the TLV memory 402. In certain embodiments of the present disclosure, the modification of one or more TLV parameters may be captured and indicated in the TLV bitmap. For example, the value of a bit in the TLV bitmap corresponding to a modified TLV parameter may be changed from '0' to '1' to indicate the modification of said TLV parameter in the TLV memory 402.

At 708, the TLV engine 400 may determine if the one or more MAC management messages modified one or more TLV parameters within the subset of TLV parameters utilized by the client module. In some embodiments of the present disclosure, this may be done by performing a bitwise logical AND of the TLV bitmap and the client module registration bitmap.

If the one or more MAC management messages do not modify one or more of the TLV parameters within the subset of TLV parameters utilized by the client module, then, at 710, the TLV engine 400 may forgo notifying the client module 410 that one or more TLV parameters have been modified. A conventional TLV engine may notify each client module of changes to TLV parameters after each MAC management message regardless of whether or not the client module utilized the TLV parameters changed by said MAC management message. This may result in unnecessary processing and memory usage within the TLV engine.

By performing a bitwise logical AND between the TLV bitmap (e.g., wherein a bit value of '1' indicates the modification of a TLV parameter in the TLV memory 402) and the client module registration bitmap (wherein a bit value of '1' indicates a subset of TLV parameters utilized by the client module), as described above, the TLV engine may generate a client module update bitmap indicating the specific TLV parameters which were both modified by the MAC management message and are utilized by the client module. At 712, the TLV engine 400 may generate a client module update bitmap, if the one or more MAC messages modify one or more of the TLV parameters within the subset of TLV parameters utilized by the client module.

At 714, the TLV engine 400 may notify the client module 410 of updates to TLV parameters within the subset of TLV parameters utilized by the client module 410. In certain embodiments, the TLV engine 400 may notify the client module 410 of updates by sending the client module update bitmap indicating the specific TLV parameters which were both modified by the MAC management message and are utilized by the client module.

In some embodiments, the TLV engine 400 may send a set of pointers indentifying the location of the updated TLV parameters following the client module update bitmap. When a client module needs to read these TLV values, the client module may use the pointers to access these TLVs directly. This may simplify and increase the speed of message storage traverse overhead by enabling a zero-copy methodology.

Figure 8:
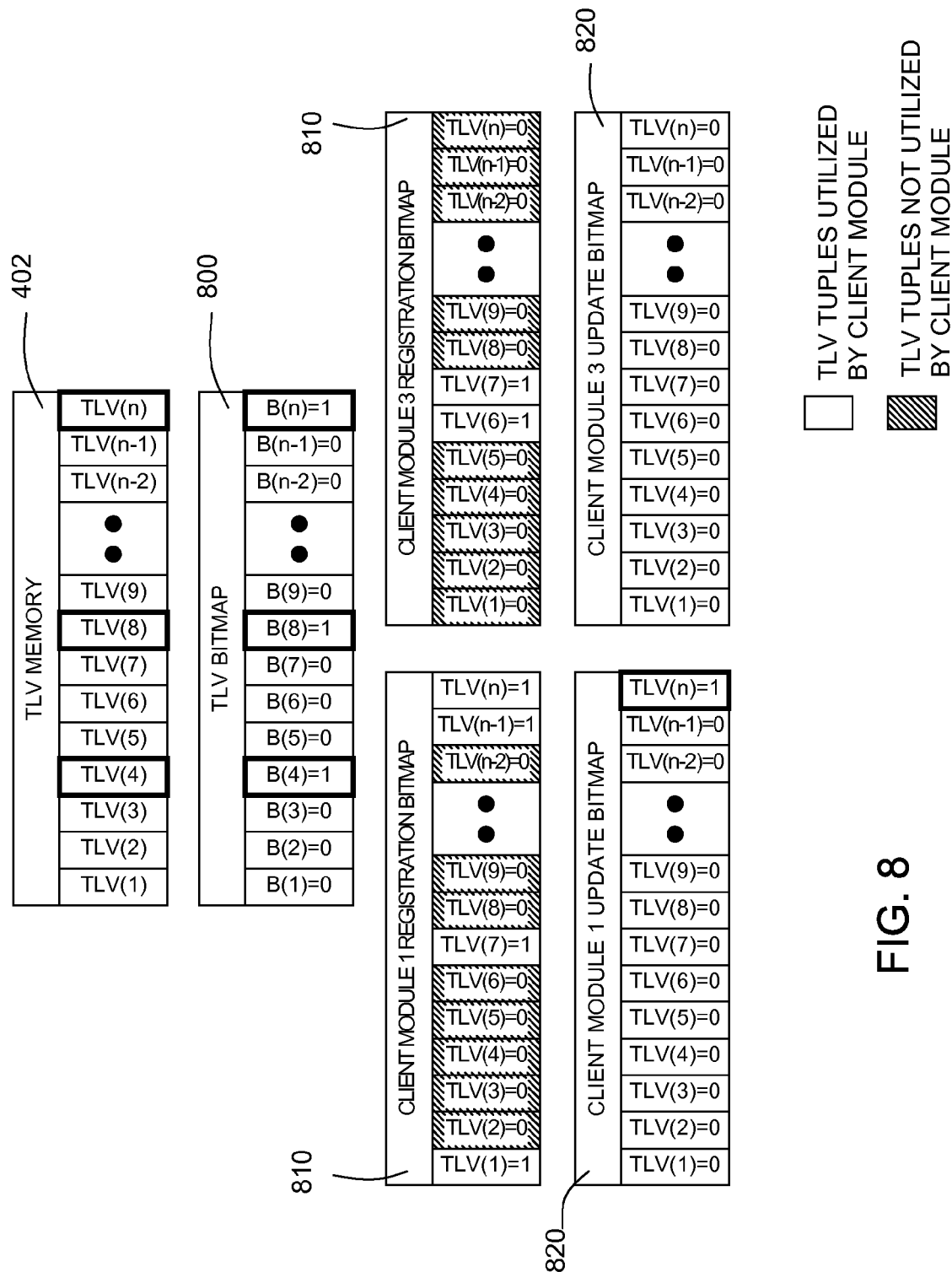
FIG. 8 illustrates the TLV engine utilizing a TLV bitmap and a client module registration bitmap to generate a client module update bitmap 820, in accordance with embodiments of the present disclosure.

FIG. 8 illustrates a TLV engine 400 utilizing a TLV bitmap 800, indicative of updates to one or more TLV parameters corresponding to the plurality of TLV parameters within a block of TLV memory 402, and a client module registration bitmap 810 corresponding to each client module, indicating a subset of TLV parameters utilized by the corresponding client module, to generate a client module update bitmap 820 corresponding to each client module. As previously described, in certain embodiments the client module update bitmap 820 may be determined by performing a bitwise logical AND operation on the TLV bitmap 800 and the client module registration bitmap 810. To facilitate understanding and simplify the example, the updating of TLV parameters for only two modules (module 1 and module 3) is illustrated.

In the illustrated example, the TLV bitmap 800 indicates that the TLV parameters TLV(4), TLV(8), and TLV(n) have been updated in response to a previously received MAC management message. Additionally, the client module registration bitmap 810 for client module 1 indicates the subset of TLV parameters utilized by the client module include the TLV tuples TLV(1), TLV(7), TLV(n-1), and TLV(n). Consequently, the only TLV parameter utilized by client module 1 that has been updated is TLV(n), as illustrated by the client module update bitmap 820.

In some instances, the subset of TLV parameters utilized by a client module may not be updated, as illustrated by client module 3. Consequently, the client module update bitmap 820 may indicate that no TLV parameters utilized by client module 3 have been updated. In some embodiments, a client module update bitmap indicating that no updates have been made to TLV parameters utilized by the client module may not be sent to the client module.

In certain instances, the TLV engine 400 may receive two or more MAC management messages before a notification of the updates is sent to the client modules. In response to receiving a plurality of MAC management messages, conventional TLV engines may communicate each update individually. However, such an approach may yield unnecessary processor consumption and delays in processing time resulting in the desynchronization of TLV parameters and the execution of instructions needing said parameters. In contrast, embodiments of the present disclosure may aggregate multiple updates, for example, condensing the multiple TLV parameter updates into a single aggregate or "summarized" client module update bitmap enabling faster processing and less processor consumption.

For example, FIGS. 9A and 9B illustrates the TLV engine 400 aggregating multiple updates resulting from two MAC management messages in a summarized client module update bitmap before client notification. As in FIG. 9A, the TLV engine 400 may receive a first MAC management message which updates TLV(4), TLV(8), and TLV(n), as indicated by TLV bitmap $800_1$. In response, the TLV engine 400 may create a client module update bitmap $820_1$ corresponding to each client module. However, rather than immediately notify any client modules of the updates, the TLV engine 400 may wait for other updates.

For example, as shown in FIG. 9B, after receiving a second MAC management message, the TLV engine 400 updating TLV(1), TLV(6), and TLV(n-2), as indicated by TLV bitmap $800_2$, the TLV engine 400 may generate a second client module update bitmap $820_2$ corresponding to each client module and combine it with the first client module update bitmap $820_1$, capturing the net changes resulting from both MAC management messages. In certain embodiments, combining the first client module update bitmap $820_1$ with the second client module update bitmap $820_2$ may be done by performing a bitwise logical OR operation with the first and second client module update bitmaps.

As described above, the sum of the first client module update bitmap $820_1$ and the second client module update bitmap $820_2$ may yield a summarized client module update bitmap $900_2$ that captures the changes to the subset of TLV tuples utilized by the client module 410 resulting from both MAC management messages. For example, the summarized client module update bitmap $900_2$ for client module 1 indicates that both TLV(1) and TLV(n) of the subset of TLV tuples utilized by client module 1 have been updated. TLV(n) being updated by the first MAC management message and TLV(1) being updated by the second MAC management message.

Similarly, the summarized client module bitmap $900_2$ for client module 3 indicates that TLV(6) is the only TLV tuple of the subset of TLV tuples utilized by client module 3 that has been updated. Although TLV tuples TLV(1), TLV(4), TLV(6), TLV(8), TLV(n-2), and TLV(n) have been changed by the two MAC management messages, only TLV tuple TLV(6) is a member of the subset of TLV tuples utilized by client module 3.

It should be noted that in certain embodiments a summarized client module update bitmap $900_1$ corresponding to each client module may be generated after receiving the first MAC management message; however, the values of the summarized client module update bitmaps $900_1$ would be identical to the values of the client module update bitmaps $820_1$. For certain embodiments, a predetermined number of updates may be "summarized" before notifying the client modules and/or updates over a predetermined period of time may be summarized before notifying the client modules.

Additionally, client modules 410 may have different methods of receiving TLV tuple update notifications. For example, a first client module may employ a pull method for receiving notification updates in which a client module 410 will access the TLV parameter after receiving a notification from the TLV engine. In contrast, a second client module may employ a query method for retrieving notification updates. Moreover, a single client module 410 may employ different methods for acquiring notification updates based on the specific TLV parameter being updated. For example, TLV parameters less prone to change or parameters that are needed only at a specific time may be acquired using a query method, while TLV parameters more prone to change or parameters accessed frequently may be acquired using a pull method.

Figure 10:
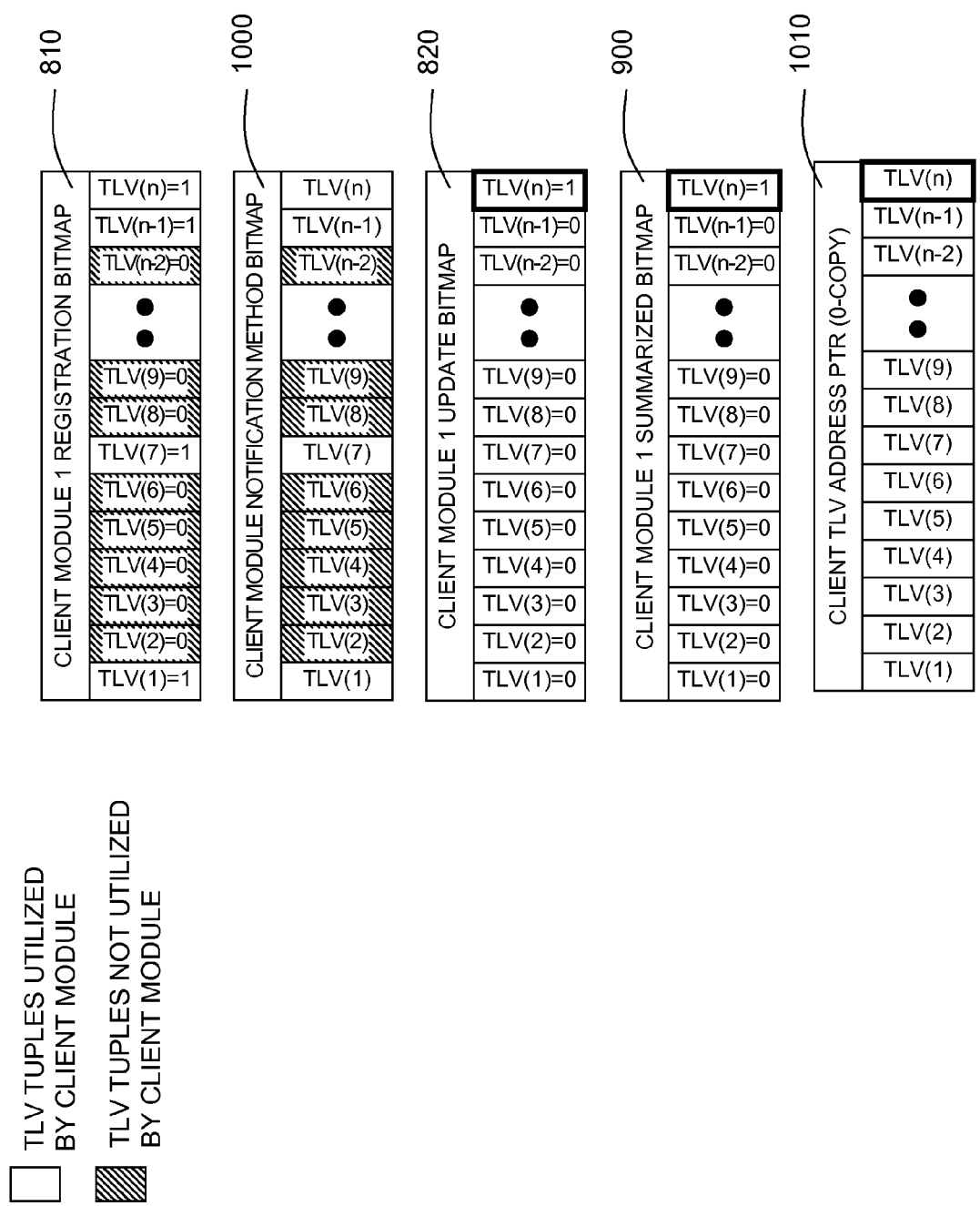
FIG. 10 illustrates a notification method bitmap 1000 and a TLV parameter memory pointer array, in accordance with embodiments of the present disclosure.

Accordingly, FIG. 10 illustrates a notification method bitmap 1000 which may be communicated to the TLV engine 400 at the same time that the client module registration bitmap 810. The notification method bitmap 1000 may have bits corresponding to each TLV parameter such that the client module 410 may indicate whether it would like to acquire the TLV parameter update via a pull method (e.g. a bit value of '0') or with a query method (e.g. a bit value of '1').

Additionally, embodiments of the present disclosure may enable the client module 410 to generate and maintain a TLV address pointer array 1010. The TLV address pointer array 1010 may be used in directly accessing the TLV parameters in the TLV memory 402. For example, the TLV engine 400 may receive a MAC management message that modifies the value of the TLV parameter TLV(n). This modification may result in data being stored at a different memory location. In response, the TLV engine 400 may generate a client module update bitmap 820 and a summarized client module bitmap indicating a change to one or more TLV parameters, as previously described.

However, the client module may not send a copy of the updated TLV tuple. Instead, the TLV engine 400 may pass an updated pointer to the TLV directing the client module to access the updated information at a new location. Accordingly, the pointer to modified TLV parameters may be passed to clients modules 410 during the notification, which may reduce memory latency in client modules 410.

Figure 7A:
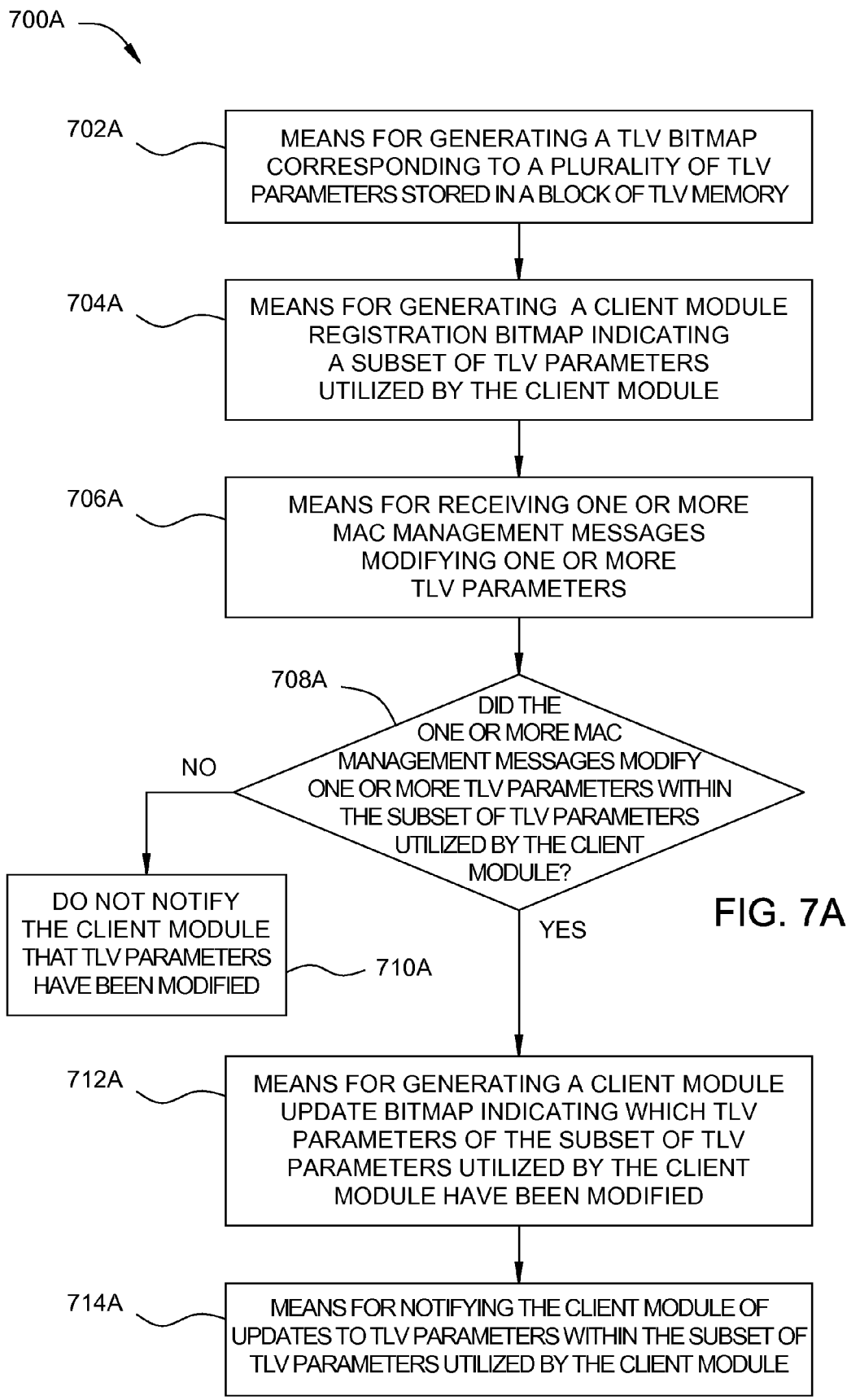
FIG. 7A illustrates example components capable of performing the operations of FIG. 7.

The various operations of methods described above may be performed by various hardware and/or software component(s) and/or module(s) corresponding to means-plus-function blocks illustrated in the Figures. Generally, where there are methods illustrated in Figures having corresponding counterpart means-plus-function Figures, the operation blocks correspond to means-plus-function blocks with similar numbering. For example, blocks 702-714 illustrated in FIG. 7 correspond to means-plus-function blocks 702A-714A illustrated in FIG. 7A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

Information and signals may be represented using any of a variety of different technologies and techniques. For example, data, instructions, commands, information, signals and the like that may be referenced throughout the above description may be represented by voltages, currents, electromagnetic waves, magnetic fields or particles, optical fields or particles or any combination thereof.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

The steps of a method or algorithm described in connection with the present disclosure may be embodied directly in hardware, in a software module executed by a processor or in a combination of the two. A software module may reside in any form of storage medium that is known in the art. Some examples of storage media that may be used include RAM memory, flash memory, ROM memory, EPROM memory, EEPROM memory, registers, a hard disk, a removable disk, a CD-ROM and so forth. A software module may comprise a single instruction, or many instructions, and may be distributed over several different code segments, among different programs and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein, such as those illustrated in the Figures, can be downloaded and/or otherwise obtained by a mobile device and/or base station as applicable. For example, such a device can be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a mobile device and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to embodiments of the present invention, other and further embodiments of the invention may be devised without departing from the basic scope thereof, and the scope thereof is determined by the claims that follow.

What is claimed is:

1. A method for managing updates to type-length-value (TLV) parameters used in a mobile station, comprising:
   receiving a medium access control (MAC) management message and in response:
   generating a TLV bitmap having a plurality of bits to indicate whether updates exist to a corresponding plurality of TLV parameters of the TLV bitmap;
   generating a child TLV bitmap corresponding to the TLV bitmap, the child TLV bitmap indicating a subset of the TLV parameters utilized by a corresponding client module running on the mobile station;
   updating the TLV bitmap to indicate the TLV parameters modified by the MAC management message;
   identifying the client module that utilizes at least one of the plurality of TLV parameters modified by the MAC management message, as indicated by the child TLV bitmap; and notifying the identified client module of the modified TLV parameters;
   wherein updating the TLV bitmap to indicate the TLV parameters modified by the MAC management message comprises:
   updating the TLV bitmap to indicate the TLV parameters modified by a first MAC management message; and
   updating the TLV bitmap to indicate the TLV parameters modified by at least a second MAC management message, such that the update TLV bitmap summarizes the TLV parameters modified by the first and at least second MAC management messages.

2. The method of claim 1, wherein notifying the identified client modules of the modified TLV parameters comprises:
   notifying the identified client module of the modified TLV parameters corresponding to the child TLV bitmap.

3. The method of claim 2, wherein notifying the identified client module of the modified TLV parameters comprises:
   transmitting, to the identified client module, at least one pointer to the modified TLV parameters.

4. The method of claim 1, wherein identifying the client module that utilizes the TLV parameters modified by the MAC management message, as indicated by the child TLV bitmap, comprises:
   performing a logical AND with the child TLV bitmap and the updated TLV bitmap.

5. The method of claim 1, wherein the TLV parameters are selected from the group consisting of: a mobile station (MS) identification TLV, a serving base station (BS) identification TLV, and a power saving class parameters TLV.

6. An apparatus for managing updates to type-length-value (TLV) parameters used in a mobile station, comprising: a memory; and at least one processor coupled to the memory and configured: to receive a medium access control (MAC) management message and in response:
   to generate a TLV bitmap having a plurality of bits to indicate whether updates exist to a corresponding plurality of TLV parameters of the TLV bitmap;
   to generate a child TLV bitmap corresponding to the TLV bitmap, the child TLV bitmap indicating a subset of the TLV parameters utilized by a corresponding client module running on the mobile station;
   to update the TLV bitmap to indicate the TLV parameters modified by the MAC management message;

to identify the client module that utilizes at least one of the plurality of TLV parameters modified by the MAC management message, as indicated by the child TLV bitmap; and to notify the identified client module of the modified TLV parameters;

wherein the processor is further configured:

to update the TLV bitmap to indicate the TLV parameters modified by a first MAC management message; and to update the TLV bitmap to indicate the TLV parameters modified by at least a second MAC management message, such that the update TLV bitmap summarizes the TLV parameters modified by the first and at least second MAC management messages.

7. The apparatus of claim 6, wherein the processor is further configured to notify the identified client module of the modified TLV parameters corresponding to the child TLV bitmap.

8. The apparatus of claim 7, wherein the processor is further configured to notify the identified client module of the modified TLV parameters by transmitting, to the identified client module, at least one pointer to the modified TLV parameters.

9. The apparatus of claim 6, wherein the processor is further configured to perform a logical AND with the child TLV bitmap and the updated TLV bitmap.

10. The apparatus of claim 6, wherein the TLV parameters are selected from the group consisting of: a mobile station (MS) identification TLV, a serving base station (BS) identification TLV, and a power saving class parameters TLV.

11. An apparatus for managing updates to type-length-value (TLV) parameters used in a mobile station, comprising:

means for receiving a medium access control (MAC) management message; and means for responding to the receipt of the MAC management message comprising:

means for generating a TLV bitmap having a plurality of bits to indicate whether updates exist to a corresponding plurality of TLV parameters of the TLV bitmap;

means for generating a child TLV bitmap corresponding to the TLV bitmap, the child TLV bitmap indicating a subset of the TLV parameters utilized by a corresponding client module running on the mobile station;

means for updating the TLV bitmap to indicate the TLV parameters modified by the MAC management message;

means for identifying the client module that utilizes at least one of the plurality of TLV parameters modified by the MAC management message, as indicated by the child TLV bitmap; and means for notifying the identified client module of the modified TLV parameters;

wherein the means for updating the TLV bitmap to indicate the TLV parameters modified by the MAC management message is configured to:

update the TLV bitmap to indicate the TLV parameters modified by a first MAC management message; and update the TLV bitmap to indicate the TLV parameters modified by at least a second MAC management message, such that the update TLV bitmap summarizes the TLV parameters modified by the first and at least second MAC management messages.

12. The apparatus of claim 11, wherein the means for notifying the identified client module of the modified TLV parameters is configured to notify the identified client module of the modified TLV parameters corresponding to the child TLV bitmap.

13. The apparatus of claim 12, wherein the means for notifying the client module of the modified TLV parameters is configured to transmit, to the identified client module, at least one pointer to the modified TLV parameters.

14. The apparatus of claim 11, wherein the means for identifying the client module that utilizes the TLV parameters modified by the MAC management message, as indicated by the child TLV bitmap, is configured to perform a logical AND with the child TLV bitmap and the updated TLV bitmap.

15. The apparatus of claim 11, wherein the TLV parameters are selected from the group consisting of: a mobile station (MS) identification TLV, a serving base station (BS) identification TLV, and a power saving class parameters TLV.

16. A computer-program product for managing updates to type-length-value (TLV) parameters used in a mobile station, comprising a computer readable medium having non-transitory instructions stored thereon, the instructions being executable by one or more processors and the instructions comprising:

instructions to receive a medium access control (MAC) management message;

instructions to respond to receipt of the medium access control (MAC) management message comprising:

instructions for generating a TLV bitmap having a plurality of bits to indicate whether updates exist to a corresponding plurality of TLV parameters of the TLV bitmap;

instructions for generating a child TLV bitmap corresponding to the TLV bitmap, the child TLV bitmap indicating a subset of the TLV parameters utilized by a corresponding client module running on the mobile station;

instructions for updating the TLV bitmap to indicate the TLV parameters modified by the MAC management message;

instructions for identifying the client module that utilizes at least one of the plurality of TLV parameters modified by the MAC management message, as indicated by the child TLV bitmap; and instructions for notifying the identified client module of the modified TLV parameters;

wherein the instructions for updating the TLV bitmap to indicate the TLV parameters modified by the MAC management message comprise:

instructions for updating the TLV bitmap to indicate the TLV parameters modified by a first MAC management message; and instructions for updating the TLV bitmap to indicate the TLV parameters modified by at least a second MAC management message, such that the update TLV bitmap summarizes the TLV parameters modified by the first and at least second MAC management messages.

17. The computer-program product of claim 16, wherein the instructions for notifying the identified client module of the modified TLV parameters comprise:

instructions for notifying the identified client module of the modified TLV parameters corresponding to the child TLV bitmap.

18. The computer-program product of claim 17, wherein the instructions for notifying the identified client module of the modified TLV parameters comprise:

instructions for transmitting, to the identified client module, at least one pointer to the modified TLV parameters.

19. The computer-program product of claim 16, wherein the instructions for identifying the client module that utilizes the TLV parameters modified by the MAC management message, as indicated by the child TLV bitmap, comprise:

instructions for performing a logical AND with the child TLV bitmap and the updated TLV bitmap.

20. The computer-program product of claim 16, wherein the TLV parameters are selected from the group consisting of: a mobile station (MS) identification TLV, a serving base station (BS) identification TLV, and a power saving class parameters TLV.

* * * * *